United States Patent [19]

Enari et al.

[11] Patent Number: 4,977,452
[45] Date of Patent: Dec. 11, 1990

[54] SAMPLED-VALUE CODE PROCESSING DEVICE

[75] Inventors: Masahiko Enari; Makoto Shimokoriyama; Akio Fujii, all of Kanagawa, Japan

[73] Assignee: Canon Kabushiki Kaisha, Tokyo, Japan

[21] Appl. No.: 292,508

[22] Filed: Dec. 30, 1988

[30] Foreign Application Priority Data

Jan. 14, 1988 [JP] Japan ................................. 63-006067

[51] Int. Cl.$^5$ ............................................. H04N 7/12
[52] U.S. Cl. .................................. 358/138; 358/133; 375/27; 382/56
[58] Field of Search ................ 358/133, 138, 141, 12; 375/27, 28; 382/56; 341/67, 122

[56] References Cited

U.S. PATENT DOCUMENTS

| 2,905,756 | 9/1959 | Graham | 358/135 |
| 4,661,862 | 4/1987 | Thompson | 358/133 |
| 4,665,436 | 5/1987 | Osborne et al. | 358/136 |
| 4,782,387 | 11/1988 | Sabri et al. | 358/133 |
| 4,827,336 | 5/1989 | Acampora et al. | 358/135 |

Primary Examiner—John K. Peng
Attorney, Agent, or Firm—Robin, Blecker, Daley & Driscoll

[57] ABSTRACT

A sampled-value code processing device in which, from the sampled-value code series input at a predetermined period, a first code series consisting of codes related to a group of sampled values determined according to a prescribed rule and a second code series consisting of codes related to sampled values other than the group of sampled values are each produced at a period longer than the predetermined period, and a filtering process for the first code series is performed by using the second code series.

11 Claims, 6 Drawing Sheets

Sampled-VALUE CODE PROCESSING DEVICE

BACKGROUND OF THE INVENTION

1. Field of the Invention:

This invention relates to sampled-value code processing devices and, more particularly, to a sampled-value code processing device for transmitting only sampled values determined according to a prescribed rule.

2. Description of the Related Art:

Recently, as a technology of defining images to ever higher level advances, for example, a television image which comes in daily life is transforming from the NTSC type to the high-definition television type. When such a high-definition image is recorded on a recording medium such as tape or disc, or transmitted to a remote place through a satellite or optical fibers, on consideration of the image quality deterioration factors such as S/N and jitter, the digital transmission is rather advantageous than the analog transmission.

Yet, even when performing the digital transmission, if, simply, the only measure taken is that the analog image signal is converted into a digital form to be transmitted, there are difficulties in the point of the capabilities of a transmission path (the capacity of a recording medium in the recording time, the capacitance of a communication medium and the cost). For example, if an attempt is made to secure not less than 30 MHz for the frequency band of a video signal, the sampling theorem teaches that the sampling must be done at a rate of at least 60 MHz. Suppose the A/D conversion is carried out with 74.25 MHz and 8 bits, then the transmission rate becomes 74.25(MHz)×8(bit) =594(Mbit/s).

Figure 1:
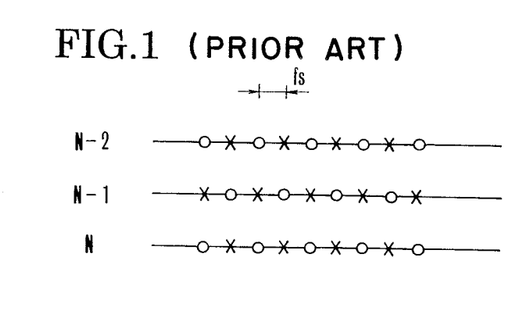
FIG. 1 is a diagram illustrating an example of the typical sub-sampling pattern.

In the conventional digital image transmission system, a method of compressing such huge information quantity without damaging the image quality has been considered. Its typical example is a sub-sampling method in which sampled values of picture elements are thinned out by utilizing the correlation of the picture elements and according to a given rule. Referring to FIG. 1, lateral lines N-2, N-1 and N are consecutive horizontal scanning lines, with a mark "o" and a mark "x" representing the picture elements picked up at a sampling frequency fs. It should be noted that the picture elements of the mark "x", when in sub-sampling, are left out by thinning-out and are not transmitted. On the receiver side, they are restored from the picture elements of the mark "o" by interpolation, etc. The method of thinning out picture elements with one picture element shifted line by line, as shown in FIG. 1, is called the "line-offset sub-sampling" method. By using this, the information quantity is halved.

Figure 2:
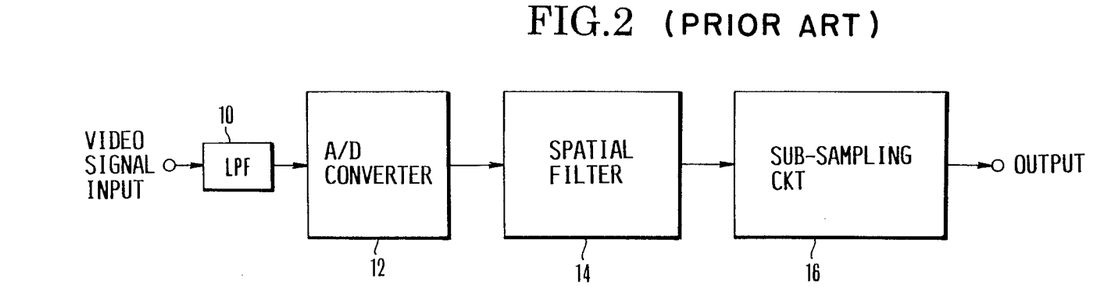
FIG. 2 is a block diagram illustrating the fundamental structure of the processing device for performing sub-sampling.
Figure 3A:
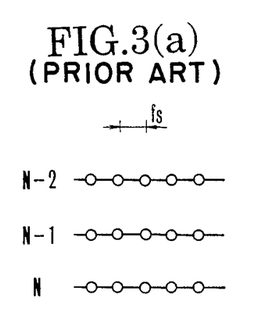
FIGS. 3(a), 3(b) and 3(c) are diagrams to explain the processing steps in FIG. 2.
Figure 3B:
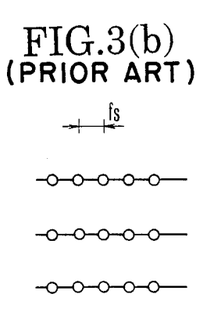
Figure 3C:
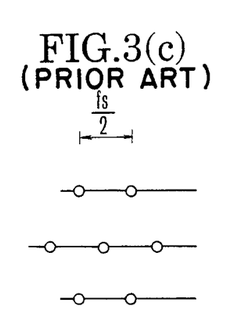

FIG. 2 is a block diagram illustrating the principle of a circuit for sub-sampling the video signal to be transmitted. The circuit comprises an analog low-pass filter 10 for band limitation before sampling, an A/D converter 12, a digital spatial filter 14 for band limitation before sub-sampling, and a sub-sampling circuit 16. The spatial filter 14 is a very important circuit which determines the image quality after the sub-sampling. Concerning the filter structure, the number of taps, etc., many systems as adapted to the sub-sampling processes have been proposed. FIGS. 3(a), 3(b) and 3(c) represent steps of the sub-sampling process performed by the circuit of the construction shown in FIG. 2. FIG. 3(a) shows picture elements at the output of the A/D converter 12; FIG. 3(b) shows picture elements at the output of the spatial filter 14, and FIG. 3(c) shows picture elements at the output of the sampling circuit 16. In short, the original picture elements of FIG. 3(a) are all subjected to filtering by the spatial filter 14, becoming the filtered picture elements of FIG. 3(b). Then, in the sampling circuit 16, the filtered picture elements are thinned out to be left out every other picture element. Thus, what is shown in FIG. 3(c) is obtained.

Figure 4:
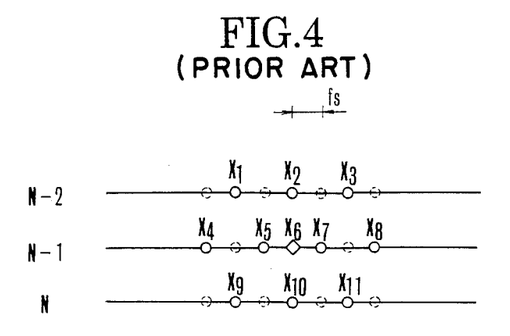
FIG. 4 is a diagram to explain the principle of the spatial filter.

The method of producing the filtered picture elements by means of the spatial filter 14 is briefly explained. With respect to the picture element, for example, $x_6$ shown in FIG. 4, a filtered picture element $\bar{x}_6$ is produced by computation based on the following formula:

$$\bar{x} = (1/A) \{k_5 x_6 + k_4(x_4+x_8) + k_3(x_5+x_7) + k_2(x_2+x_{10}) - k_1(x_1+x_9+x_3+x_{11})\} \ldots (1)$$

where $x_1$ through $x_{11}$ are original picture element data, $k_1$ through $k_5$ are positive coefficients, and A is a positive constant. By recycling this computation for every one picture element at the sampling frequency fs, each filtered picture element of FIG. 3(b) can be obtained.

Figure 5:
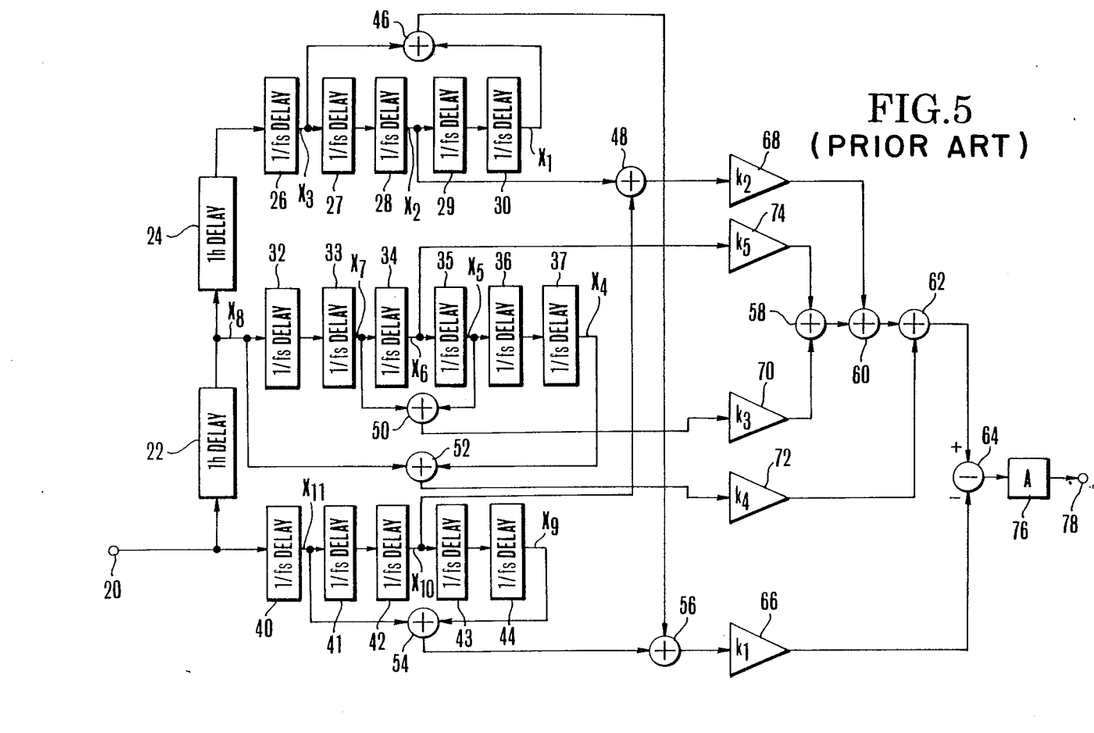
FIG. 5 is a block diagram illustrating the structure of the general spatial filter.

FIG. 5 is a block diagram of the ordinary spatial filter 14 comprising an input terminal 20, 1-line or $1_h$ (horizontal scanning period) delay circuits 22 and 24, 1-picture element (l/fs) delay circuits 26, 27, 28, 29, 30, 32, 33, 34, 35, 36, 37, 40, 41, 42, 43, 44 which are disposed before the sub-sampling process, adders 46, 48, 50, 52, 54, 56, 58, 60 and 62, a subtractor 64, multipliers 66, 68, 70, 72 and 74 which have coefficients $k_1$ to $k_5$, respectively, a divider having a divisor A, and an output terminal 78. As the multipliers 66, 68, 70, 72 and 74 use is generally made of such a ROM that the multiplication relationship of the coefficients $k_1$-$k_5$ is established between the memory addresses and the memorized values. The outputs of the adders 56, 48, 50 and 52 are respectively $(x_1+x_9+x_3+x_{11})$, $(x_2+x_{10})$, $(x_5+x_7)$ and $(x_4+x_8)$. This circuit realizes the computation of the above-defined equation (1) with fidelity. The filtered picture element value $\bar{x}_6$ with respect to the original picture element $x_6$ is output from the output terminal 78.

However, in such a conventional circuit as described above, the circuit scale gets very large. Further, all the circuit elements of FIG. 5 have to operate at the sampling frequency fs. These constitute a drawback that when the sampling frequency fs is 74.25 MHz, TTL (transistor-transistor logic) or CMOS (complementary metal-oxide semiconductor) elements do not work. Hence, use must be made of high-speed operable ECL (Emitter Coupled Logic) elements. If the ECL element is used, enormous electrical energy is consumed, and a great scale of circuit results.

SUMMARY OF THE INVENTION:

With such a background in mind, an object of the present invention is to provide a sampled-value code processing device which can eliminate the above-described problem.

Another object of the present invention is to provide a sampled-value code processing device which enables the processing speed of the filtering treatment to be lowered.

Under such objects, according to the invention, as its one embodiment, a sampled-value code processing device is proposed comprising input means for inputting a sampled-value code series representing sampled values of an information signal at a predetermined period, code series converting means for forming, from the sampled-value code series input by said input means, a first code series consisting of codes related to a group of sampled values determined according to a predetermined rule and a second code series consisting of codes related to sampled values other than the group of sampled values and for outputting the first code series and the second code series at an output period longer than the predetermined period, and filtering means for applying a filtering process to the first code series output from the converting means by using the second code series.

Other objects than those described above of the invention and its features will become apparent from the following detailed description of embodiments of the invention.

DETAILED DESCRIPTION OF THE PREFERRED EMBODIMENTS

Figure 6:
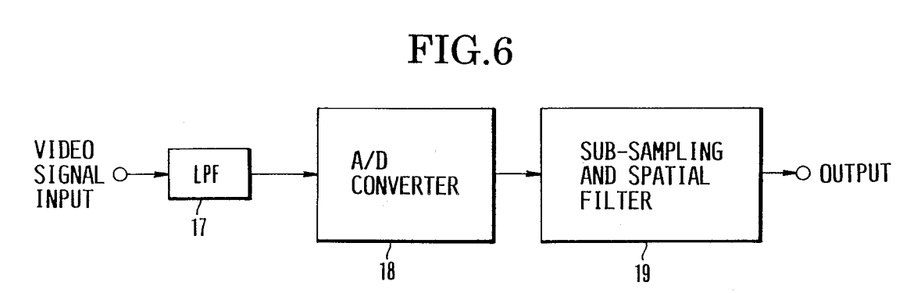
FIG. 6 is a block diagram illustrating the structure of the entirety of a processing device according to the invention.
Figure 7:
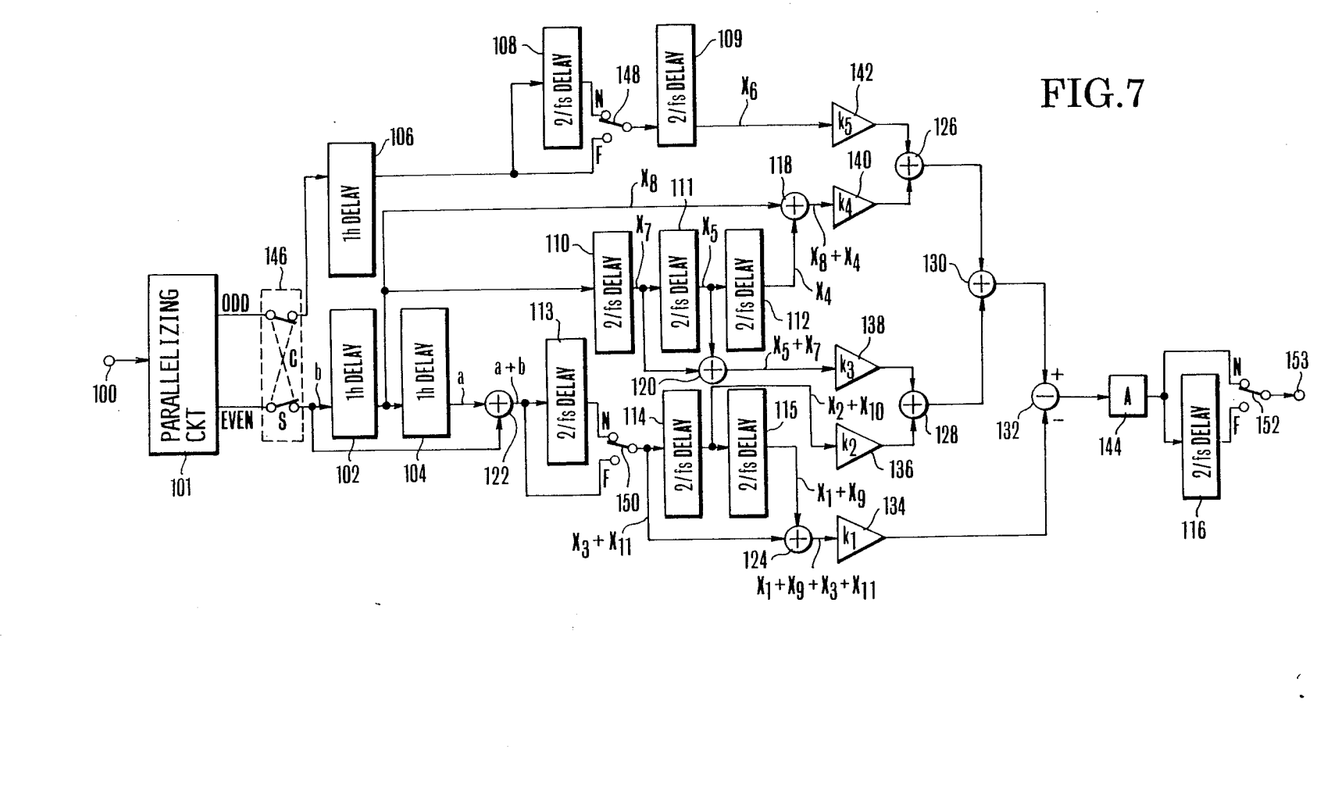
FIG. 7 is a block diagram illustrating an example of construction of a sub-sampling and spatial filter of FIG. 6.

In the following, an embodiment of the invention is described by reference to the drawings:

FIG. 6 is a block diagram showing the fundamental structure of the embodiment of the invention. 17 is an analog low-pass filter for band limitation before sampling; 18 is an A/D converter; 19 is a sub-sampling and spatial filter for performing sub-sampling and spatial filtering. FIG. 7 is a block diagram showing the details of the structure of the sub-sampling and spatial filter 19. This circuit of FIG. 7 also, in view of the spatial filtering function, carries out processing according to the computation of the equation (1) and uses the same reference characters as those in FIG. 4. In FIG. 7, a digital signal output from the A/D converter 18 enters at an input terminal 100. The input data series is parallelized by a parallelizing circuit 101. Delay circuits 102, 104 and 106 each delay an input signal by 1 h (where h is a horizontal scanning period). Delay circuits 108, 109, 110, 111, 112, 113, 114, 115 and 116 each delay an input signal by one picture element (2/fs) obtained after sub-sampling. 118, 120, 122, 124, 126, 128 and 130 are adders; 132 is a subtractor; 134, 136, 138, 140 and 142 are multipliers having coefficients $k_1-k_5$, respectively. 144 is a divider having a divisor A.

146 is a changeover switch for alternating two original picture element data parallelized by the parallelizing circuit 101 in every one line. 148, 150 and 152 are compensation switches for compensating for the delay of a picture element, which are changed over in association with the changeover switch 146. The changeover switch 146 and the compensation switches 148, 150 and 152 are changed over together in every one line. When the changeover switch 146 takes the straight (S) connection, each of the compensation switches 148, 150 and 152 is in connection to N side. When the changeover switch 146 takes the cross (C) connection, each of the compensation switches 148, 150 and 152 is in connection to F side. 153 is an output terminal.

It should be noted that all the circuit elements of FIG. 7 operate at a clock of fs/2 in frequency.

Figure 8:
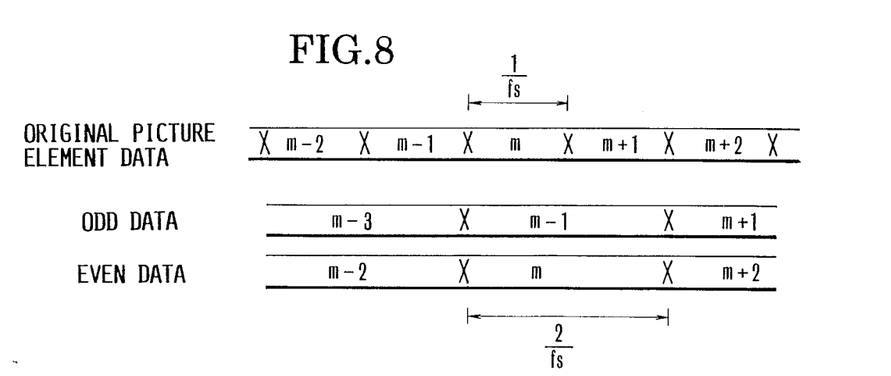
FIG. 8 is a timing chart illustrating the operation timing of FIG. 7.

FIG. 8 shows the timing at which the original picture element data is parallelized by the parallelizing circuit 101. In FIG. 8, where an even value is denoted by m, preceding data is referred to as "ODD" data, and succeeding data is referred to as "EVEN" data.

Figure 9A:
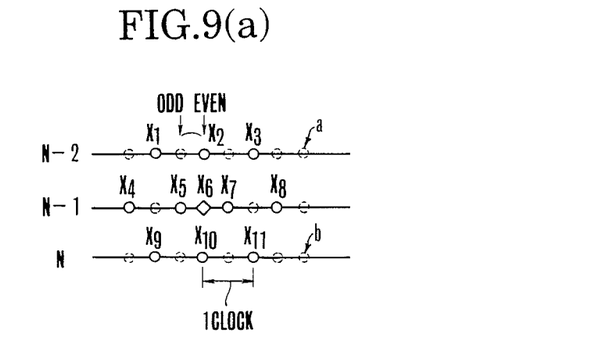
FIGS. 9(a) and 9(b) are diagrams to explain the operation of FIG. 7.
Figure 9B:
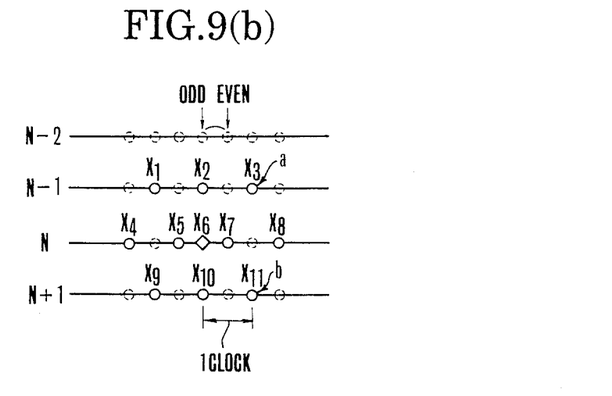

In a case where the picture element $x_6$ under the filtering treatment is EVEN data, because the changeover switch 146 shown in FIG. 7 was set in the cross (C) state before one line, the changeover switch 146 is in the straight (S) state, while the compensation switches 148, 150 and 152 are connected to the N side. FIG. 9(a) shows the relationship between lines and picture elements $x_1-x_{11}$ in this case. "a" and "b" shown in FIG. 9(a) correspond to the "a" and "b" shown in FIG. 7. Alternatively, in a case where the picture element $x_6$ under the filtering treatment is ODD data, because the changeover switch 146, before one line, was set to the straight (S) state, the changeover switch 146 is set to the cross (C) state, while the compensation switches 148, 150 and 152 are connected to the F side. FIG. 9(b) shows the positional relationship in this case. Because the compensation switches 148 and 152 are connected at the same time to either the N side or the F side, the delay amount of a picture element to be filtered is always constant. By designing the circuit in such a way, it is made possible that the operating clock of each portion of the filter has its frequency reduced to fs/2. Therefore, without using the high-speed operable circuit elements, the filter can be constructed.

Although, in the foregoing description, the line-offset sub-sampling with 3 picture elements in the vertical direction and 7 picture elements in the horizontal direction used at once, i.e., a 3×7 tap spatial filter, has been taken as an example, it is needless to say that the invention is applicable to other sub-sampling methods or other spatial filters of different tap number.

Also, although, in the above-described embodiment, selection of the positions of the picture elements to be sub-sampled is changed in each line, if the positions of the picture elements to be used in sub-sampling are shifted at a period of every three lines or more, the rate of sampled picture elements is reduced to ⅓ or less, and the circuit can be made to operate at a lower frequency than fs/2.

As is understandable from the foregoing description, according to the invention, the spatial filtering and sub-sampling circuit is able to operate by a clock having a frequency ½ times as high as the sampling frequency. Hence, the processing device can be manufactured without the necessity of using high-speed operating elements. As a result, the circuit scale can be minimized, and the consumption of electrical energy can be reduced.

What is claimed is:

1. A sampled-value code processing device comprising:

(a) input means for inputting a sampled-value code series representing sampled values of an information signal at a predetermined period;

(b) code series converting means for forming, from the sampled-value code series input by said input means, a first code series consisting of codes related to a group of sampled values determined according to a predetermined rule and a second code series consisting of codes related to sampled values other than the group of sampled values, and for outputting the first code series and the second code series at an output period longer than the predetermined period, said converting means including a parallelizing circuit for outputting a plurality of code series by parallelizing a plurality of codes in the sampled-value code series; and (c) filtering means for applying a filtering process to the first code series output from said converting means by using said second code series.

2. A device according to claim 1, wherein said parallelizing circuit outputs adjacent two codes in the sampled-value code series in parallel at the same timing.

3. A device according to claim 1, wherein said parallelizing circuit outputs the plurality of code series at a period equal to the output period of said code series converting means.

4. A device according to claim 1, wherein said information signal is a video signal, and wherein said filtering means includes a delay circuit having a delay time equal to integer times a period corresponding to one line of the video signal, and a computing circuit for computing a code series to be input to said delay circuit and a code series output from said delay circuit.

5. A device according to claim 1, wherein said filtering means includes a delay circuit having a delay time corresponding to the output period of said code series converting means, and a computing circuit for computing a code series to be input to said delay circuit and a code series output from said delay circuit.

6. A device according to claim 5, wherein said filtering means includes a first processing circuit to which only the second code series is input, and a computing circuit for computing a code series output from said first processing circuit and the first code series to output a third code series.

7. A device according to claim 1, wherein said code series converting means further includes a switching circuit for selectively outputting the plurality of code series output from said parallelizing circuit to form the first code series and the second code series.

8. A device according to claim 7, wherein the information signal is a video signal, and wherein said switching circuit is changed over in each period corresponding to one line of the video signal.

9. A device according to claim 8, wherein said switching circuit includes a first switch for outputting the first code series and a second switch for outputting the second code series, said first switch and said second switch outputting codes of respective different code series in the plurality of code series.

10. A sampled-value code processing device comprising:

(a) input means for inputting a sampled-value code series representing sampled values of an information signal at a predetermined period;

(b) code series converting means for forming, from the sampled-value code series input by said input means, a first code series consisting of codes related to a group of sampled values determined according to a predetermined rule, and for outputting the first code series at an output period longer than the predetermined period, said converting means including a parallelizing circuit for outputting a plurality of code series, by parallelizing a plurality of codes in the sample-value code series; and (c) filtering means for applying a filtering process to the first code series output from said converting means by using codes related to sampled values other than the group of sampled values.

11. A sampled-value code processing device comprising:

(a) input means for inputting a sampled-value code series representing sampled values of an information signal at a predetermined period;

(b) code series converting means for forming, from the sample-value code series input by said input means, a first code series consisting of codes related to a group of sampled values determined according a predetermined rule and a second code series consisting of codes related to sampled values other than the group of sampled values, and for synchronously outputting the first code series and the second code series at an output period longer that the predetermined period, said converting means including a parallelizing circuit for outputting a plurality of code series by parallelizing a plurality of codes in the sampled-value code series; and (c) filtering means for applying a filtering process to the first code series output from said converting means by using codes related to sampled values other than the group of sampled values.

* * * * *

UNITED STATES PATENT AND TRADEMARK OFFICE
CERTIFICATE OF CORRECTION

PATENT NO. : 4,977,452

DATED : December 11, 1990

INVENTOR(S) : Masahiko Enari, et al.

It is certified that error appears in the above-identified patent and that said Letters Patent is hereby corrected as shown below:

Col. 2, line 11. Change "$X_6$" to -- $\bar{X}_6$ --

Col. 2, line 14. Change "$\bar{X} = (1/A)$" to -- $\bar{X}_6 = (1/A)$ --

Signed and Sealed this

Thirtieth Day of June, 1992

Attest:

DOUGLAS B. COMER

*Attesting Officer*  *Acting Commissioner of Patents and Trademarks*